US011947324B1

(12) United States Patent
Huong et al.

(10) Patent No.: US 11,947,324 B1
(45) Date of Patent: Apr. 2, 2024

(54) TOPICAL APPLICATOR WITH INTEGRAL SERUM CAPSULE SYSTEM

(71) Applicant: WEIRD&WOW LLC, Boston, MA (US)

(72) Inventors: Bui Nguyen Huong, Ha Noi (VN); Vu Manh Tuan, Binh Phuoc (VN)

(73) Assignee: Weird & Wow LLC, Boston, MA (US)

( * ) Notice: Subject to any disclaimer, the term of this patent is extended or adjusted under 35 U.S.C. 154(b) by 0 days.

(21) Appl. No.: 18/340,964

(22) Filed: Jun. 26, 2023

(51) Int. Cl.

| | |
|---|---|
| ***A45D 34/04*** | (2006.01) |
| ***A45D 44/00*** | (2006.01) |
| ***A61H 23/02*** | (2006.01) |
| ***G05B 15/02*** | (2006.01) |

(52) U.S. Cl.
CPC ........... *G05B 15/02* (2013.01); *A45D 34/041* (2013.01); *A45D 44/005* (2013.01); *A61H 23/02* (2013.01); *A45D 2200/10* (2013.01)

(58) Field of Classification Search
CPC ............ A45D 34/041; A45D 2034/005; A45D 2200/055; A45D 2200/056; A45D 2200/155; A61H 23/02; G05B 15/02
See application file for complete search history.

(56) References Cited

U.S. PATENT DOCUMENTS

| | | | |
|---|---|---|---|
| D428,142 S | 7/2000 | Stromblad | |
| 7,476,048 B2 | 1/2009 | Prague | |
| D678,783 S | 3/2013 | Wilcox et al. | |
| 8,844,543 B2 | 9/2014 | Bickford et al. | |
| 11,478,063 B2 * | 10/2022 | Suwanto | A61Q 1/12 |
| 11,528,981 B2 | 12/2022 | Messenger | |
| D974,653 S | 1/2023 | Gautier et al. | |
| 2003/0062385 A1 | 4/2003 | Engel et al. | |
| 2009/0043293 A1 | 2/2009 | Pankratov et al. | |
| 2020/0215568 A1 | 7/2020 | Waldo et al. | |
| 2022/0240650 A1 | 8/2022 | Malaprade et al. | |
| 2023/0052182 A1 | 2/2023 | Jang et al. | |
| 2023/0172799 A1 * | 6/2023 | Black | A61H 23/02 601/84 |

OTHER PUBLICATIONS

At Home Full Facial Set; https://medicube.us/collections/all/products/specialedition-at-home-full-facial-set; Apr. 25, 2023.

* cited by examiner

*Primary Examiner* — Jennifer C Chiang
(74) *Attorney, Agent, or Firm* — Aundria Hairell

(57) ABSTRACT

In one aspect, a treatment device includes an applicator face having at least one agent outlet, a mist outlet and rolling balls, a pumping system for dispersing a plurality of topical agents, a plurality of serum capsules containing each plurality of topical agents adapted to be held in a capsule cartridge, a temperature system, a vibration system, a mist system connected to the mist outlet, a therapeutic light ring, a controller having a processor with a user software configured to determine an action plan, a screen, a speaker, and a wand base connected to the applicator face.

10 Claims, 9 Drawing Sheets

TOPICAL APPLICATOR WITH INTEGRAL SERUM CAPSULE SYSTEM

BACKGROUND

The various aspects discussed herein relate to skin care products and their application. Skincare routines could significantly benefit your appearance, confidence & mood. However, traditional skincare routines can be complicated, time intensive and inconvenient for most people. Accordingly, there is a need in the art for a brand new way of caring for your skin.

BRIEF SUMMARY

In one aspect, a treatment device includes an applicator face having at least one agent outlet, a mist outlet and rolling balls, a pumping system for dispersing a plurality of topical agents, a plurality of serum capsules containing each plurality of topical agents adapted to be held in a capsule cartridge, a temperature system, a vibration system, a mist system connected to the mist outlet, a therapeutic light ring, a controller having a processor with a user software configured to determine an action plan, a screen, a speaker, and a wand base connected to the applicator face.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Details of a topical applicator with an integral serum capsule system according to the present invention will be more fully understood from the description given hereunder with reference to the accompanying drawings.

Figure 1A:
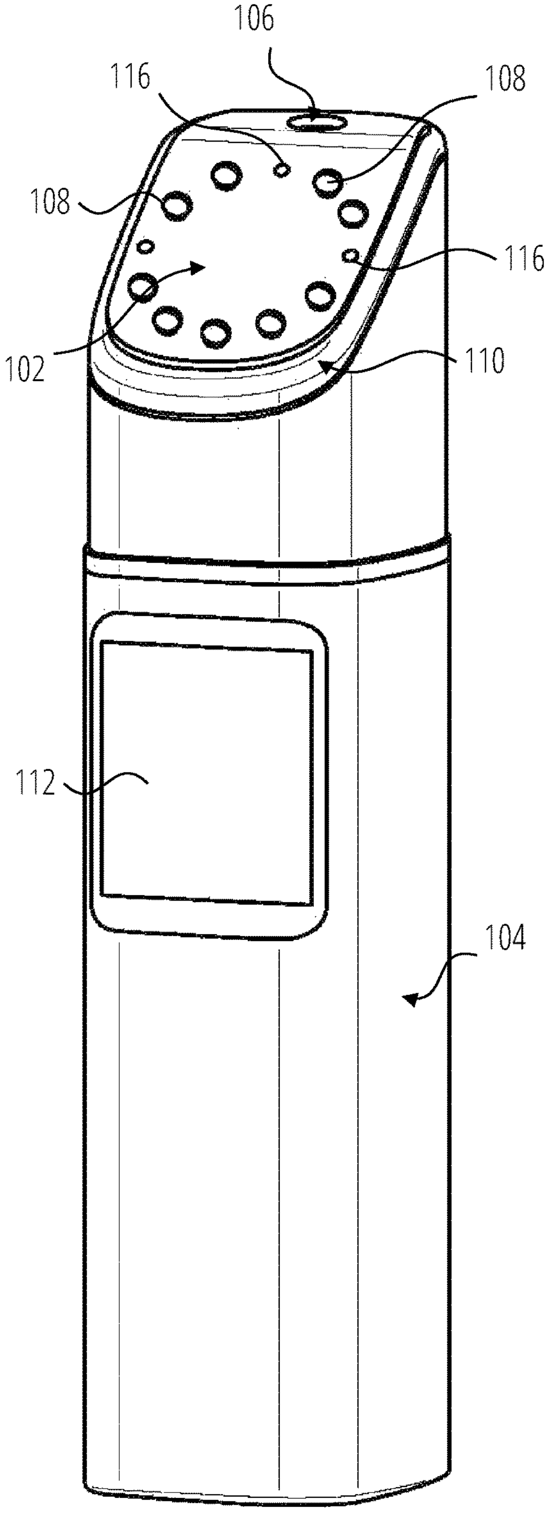
FIG. 1A illustrates an aspect of the treatment device in accordance with one embodiment.

FIG. 1A shows the system comprising an applicator face 102 and a wand base 104 extending therefrom. The applicator face 102 includes a mist outlet 106, rolling balls 108 and a therapeutic light ring 110.

When triggered by a controller, a mist system 202 is configured to release a moisturizing mist through the mist outlet 106.

The rolling balls 108 are configured to aid in applying the plurality of topical agents 302 to a user's face.

A vibration system 204 is configured to vibrate the applicator face 102 to aid in the absorption of the plurality of topical agents 302 when triggered by the controller.

Figure 1B:
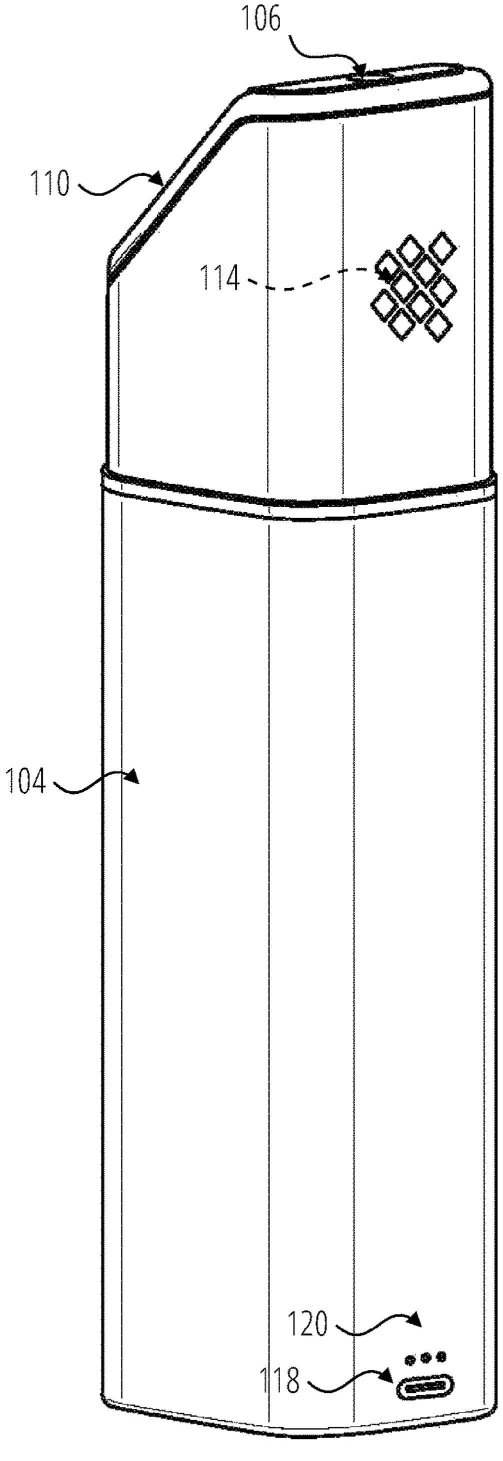
FIG. 1B illustrates an aspect of the treatment device in accordance with the embodiment.

FIG. 1B shows the system further comprises an agent outlet 116 through which a chosen set of topical agents 402 are released onto the applicator face 102. The user can then apply the chosen set of topical agents 402 with the aid of the rolling balls 108, vibration system 204, mist system 202, therapeutic light ring 110 and temperature system 206.

The wand base 104 has a screen 112 and a speaker 114. The screen 112 may be used to display a graphical user interface to be used to interact with the user software. The speaker 114 may be used for voice recognition by the user software and for issuing a set of treatment commands to the user. In one embodiment, the wand base 104 has a charging port 118 and battery indicator lights 120.

Figure 1C:
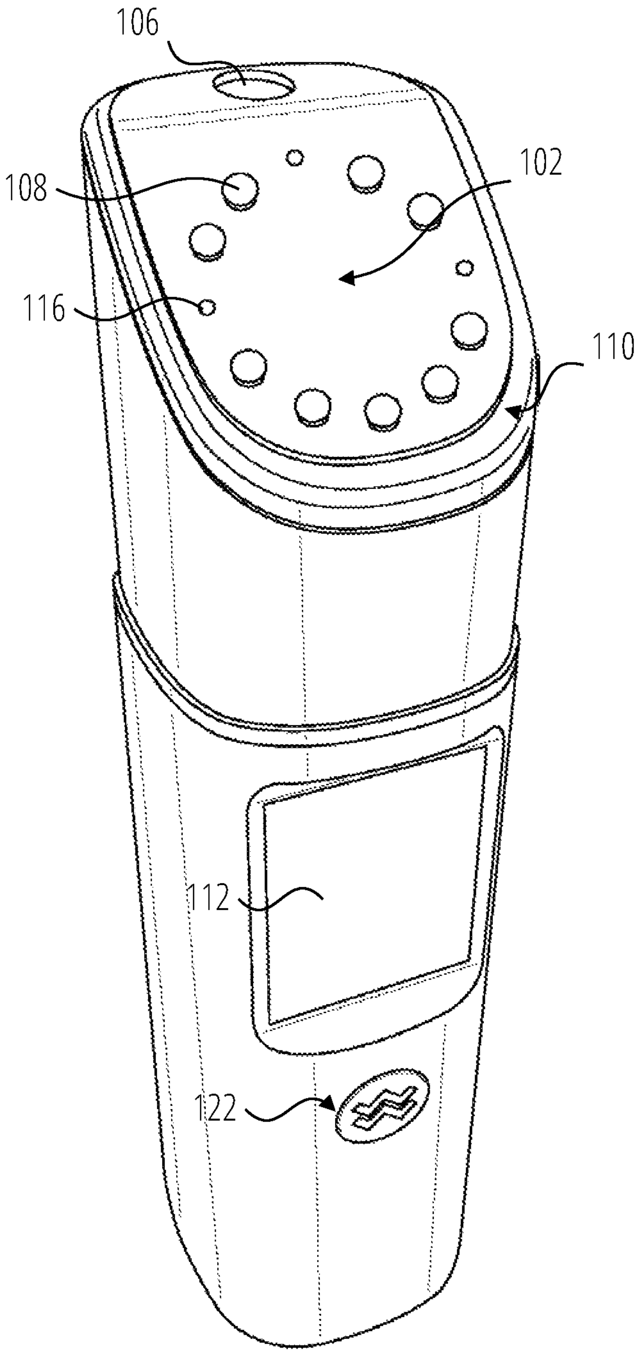
FIG. 1C illustrates an aspect of the treatment device in accordance with the embodiment.

FIG. 1C shows the system further comprises a therapeutic light ring 110. The therapeutic light ring 110 is configured to emit light at therapeutic wavelengths.

One range of light wavelengths is from 400 to 500 nanometers (nm). Within this range, light in the blue spectrum targets specific skin conditions such as acne and inflammation. Another range is between 610 to 750 nanometers (nm). This red light therapy emits light promoting collagen production, improving skin texture, reducing wrinkles, and enhancing overall skin rejuvenation.

In one embodiment, the wand base 104 may include a power button 122.

Figure 2A:
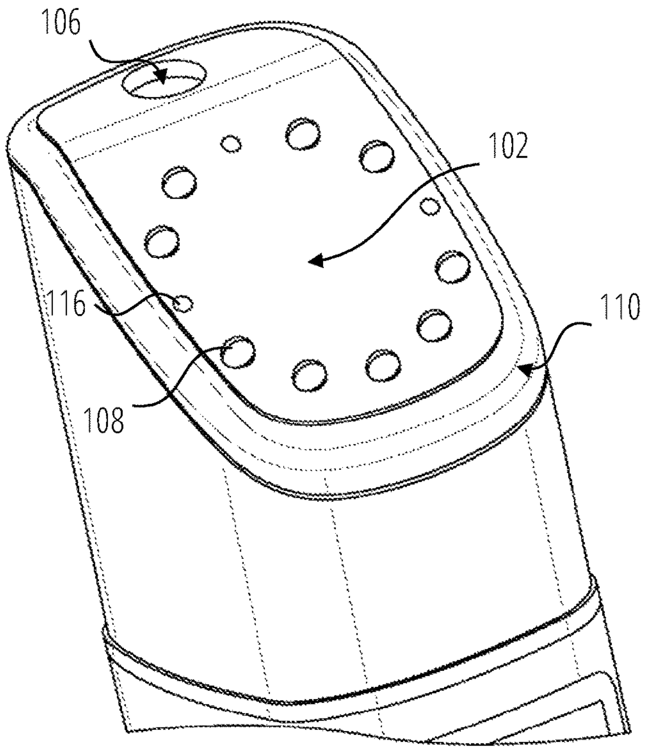
FIG. 2A illustrates an aspect of the treatment device in accordance with the embodiment.
Figure 2B:
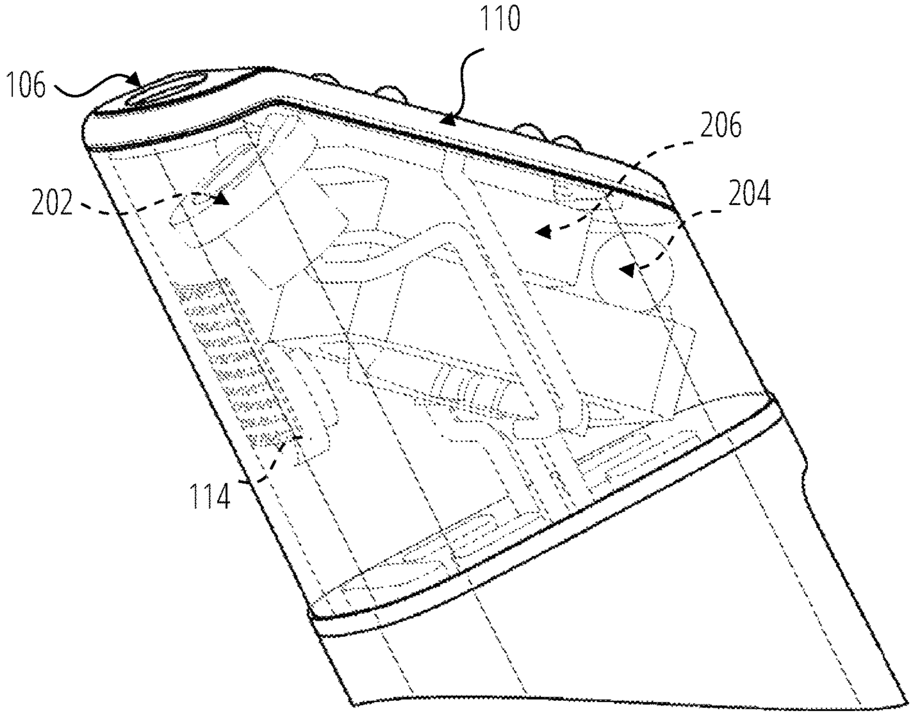
FIG. 2B illustrates an aspect of the treatment device in accordance with the embodiment.

FIG. 2A-2B shows a temperature system 206 is configured to adjust the temperature of the applicator face 102 to correspond to a therapeutic temperature generated by the controller. The temperature system can warm or cool the applicator face 102 based on an action plan generated by the user software. The warm therapy may be carried out at about 45 degree Celsius. The cold therapy may be carried out at about 5 degree Celsius.

Figure 2C:
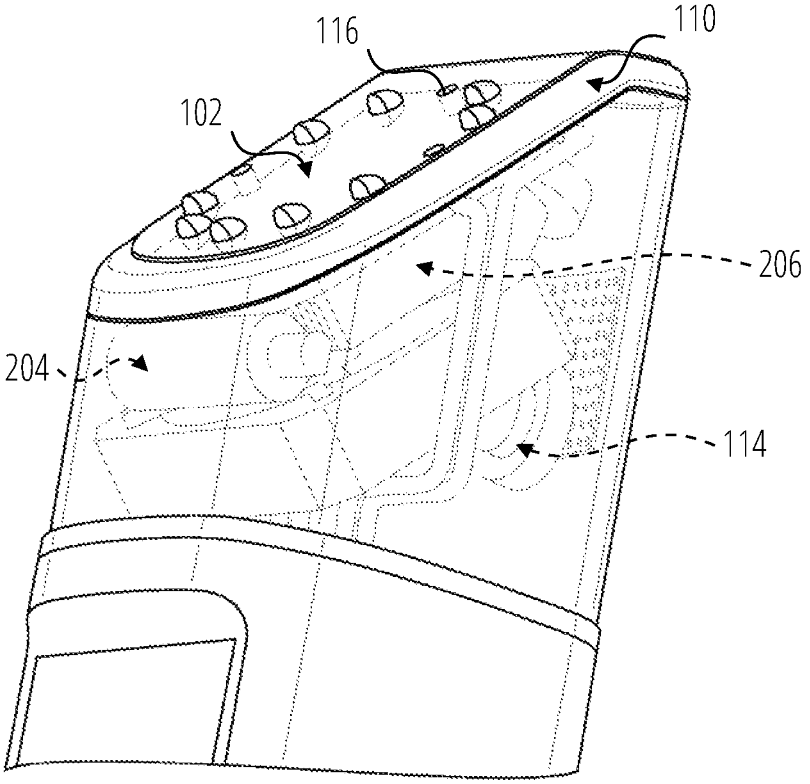
FIG. 2C illustrates an aspect of the treatment device in accordance with the embodiment.
Figure 2D:
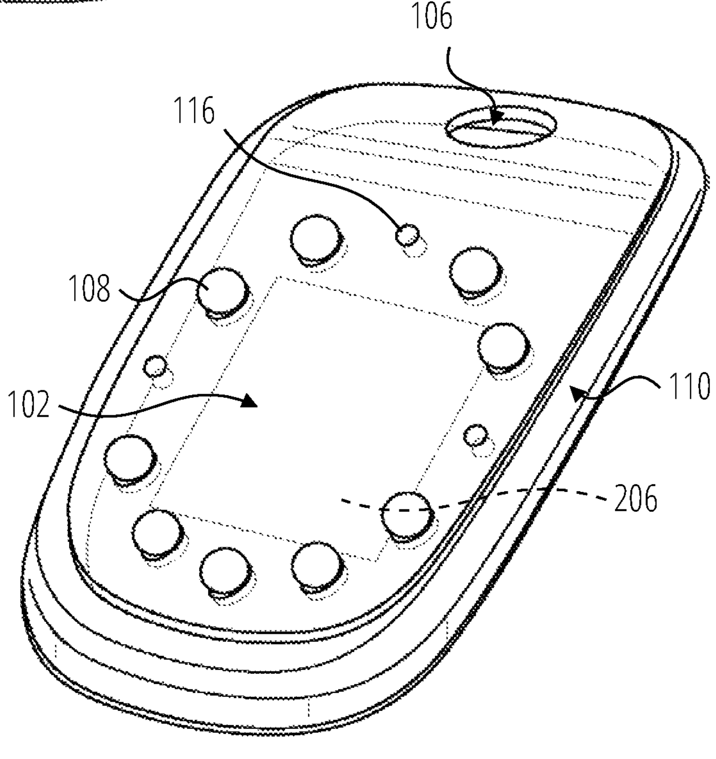
FIG. 2D illustrates an aspect of the treatment device in accordance with the embodiment.

FIG. 2C-2D shows detailed views of the applicator face 102, mist outlet 106, rolling balls 108, therapeutic light ring 110, speaker 114, agent outlet 116, vibration system 204, and temperature system 206.

Figure 3A:
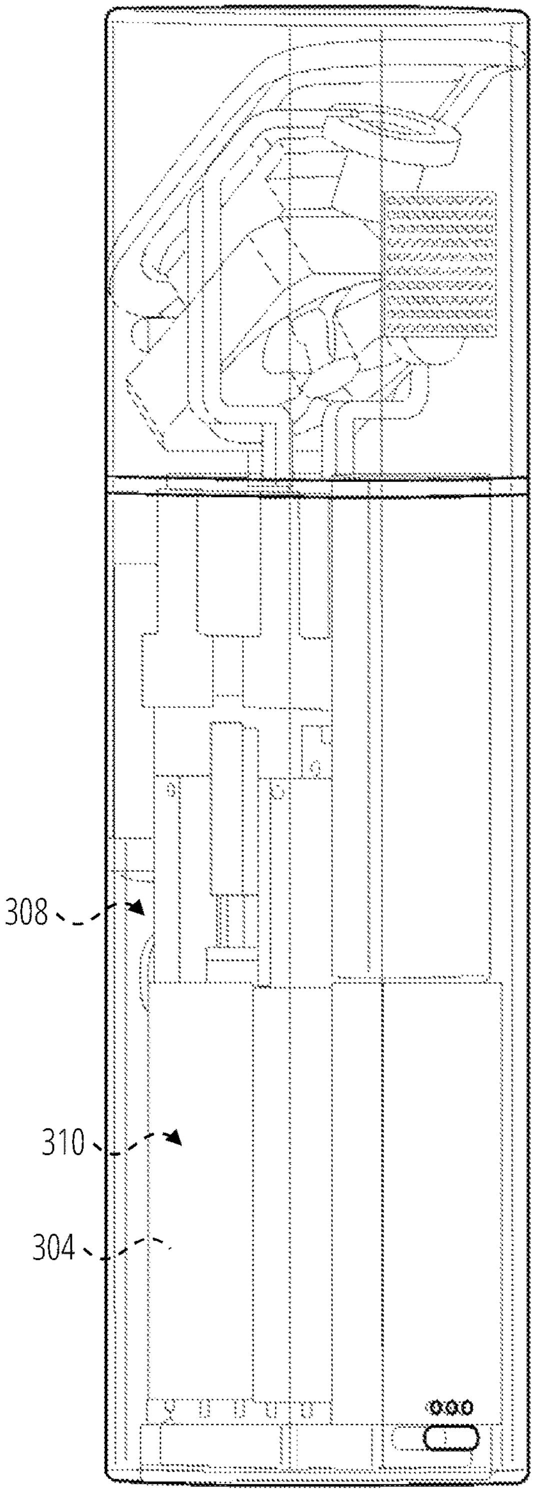
FIG. 3A illustrates an aspect of the treatment device in accordance with the embodiment.
Figure 3B:
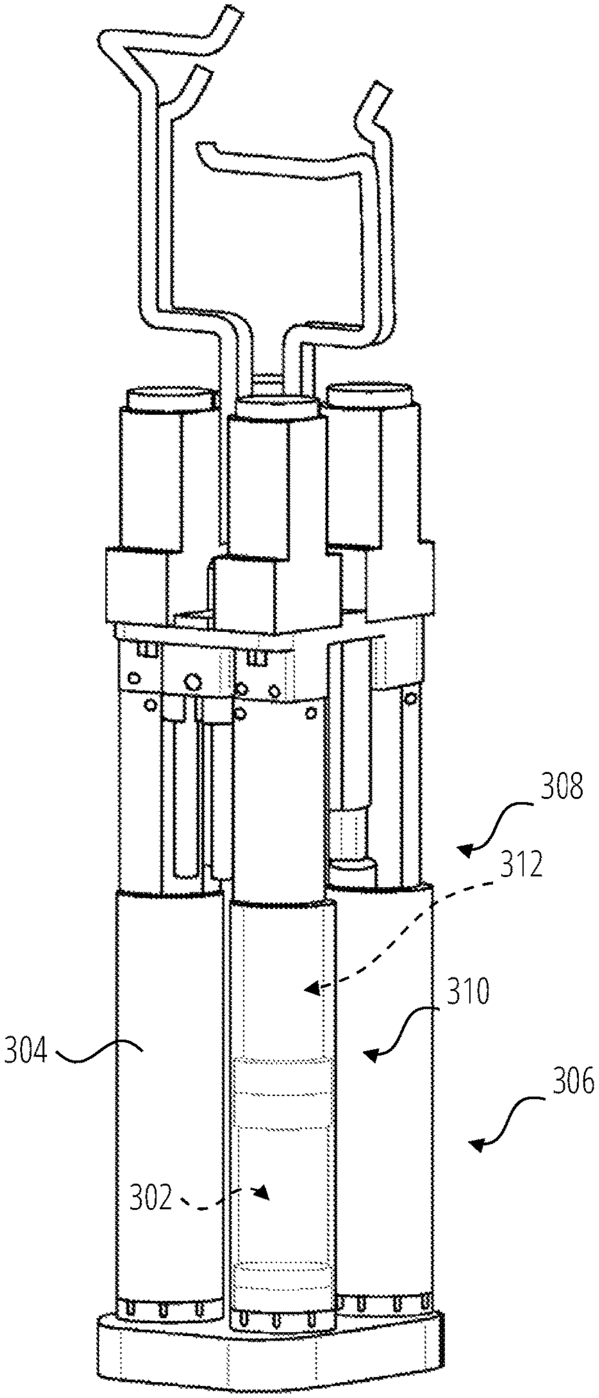
FIG. 3B illustrates an aspect of the treatment device in accordance with the embodiment.

FIG. 3A-3B shows the system comprises a plurality of topical agents 302 held within serum capsules 304. The capsule cartridge 306 holds the serum capsules 304 to be loaded into the wand base 104. The pumping system 308 is configured to engage the plurality of serum capsules 310 such that the piston 312 engages the capsule piston base 316.

Figure 3C:
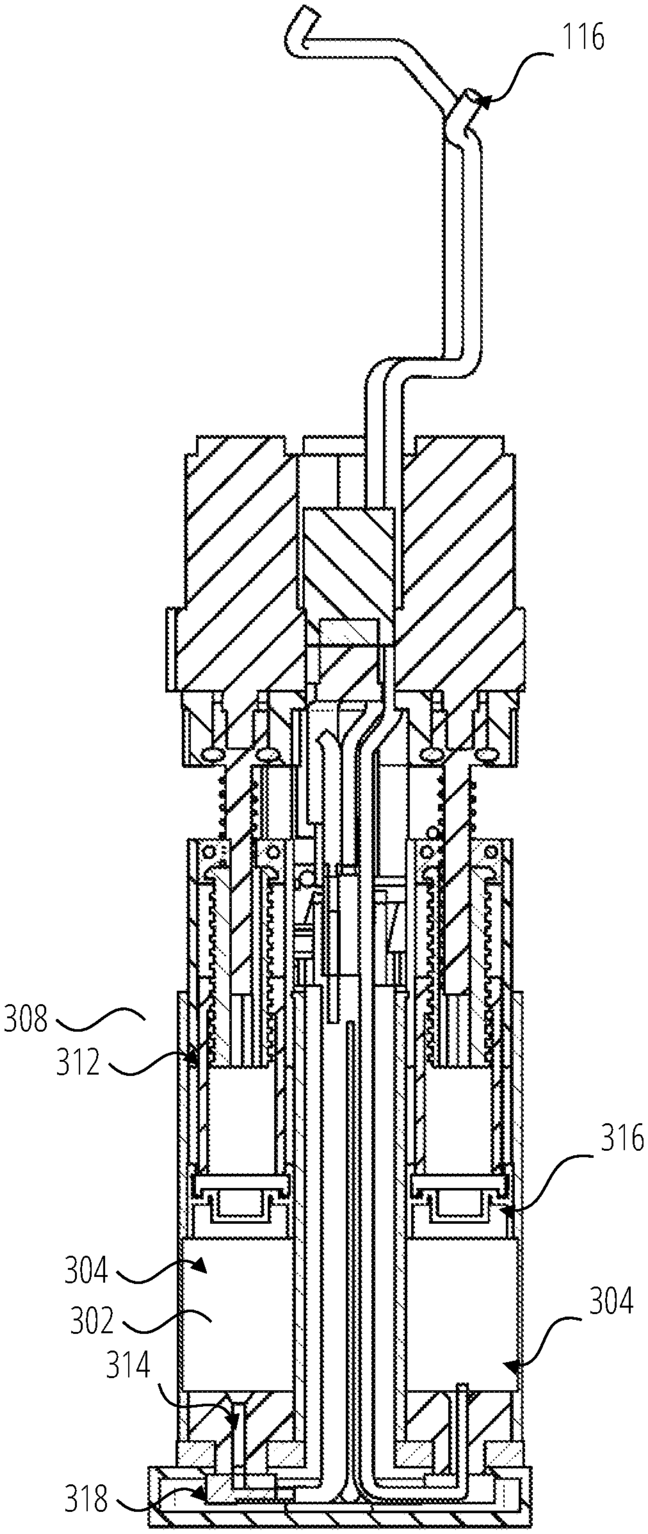
FIG. 3C illustrates an aspect of the treatment device in accordance with the embodiment.

FIG. 3C shows the system further comprises the capsule cartridge 306 having a serum outlet 314 and a capsule piston base 316. The serum outlet 314 is engaged by a capsule input 318.

Each serum capsule 304 is adapted to contain the plurality of topical agents 302 such that the topical agents 302 are not exposed to the atmosphere before being dispensed from the agent outlet 116. The controller will trigger the pumping system 308, engaging the piston 312 to push on the capsule piston base 316 and force the topical agent 302 out of the agent outlet 116 and onto the applicator face 102.

Figure 4A:
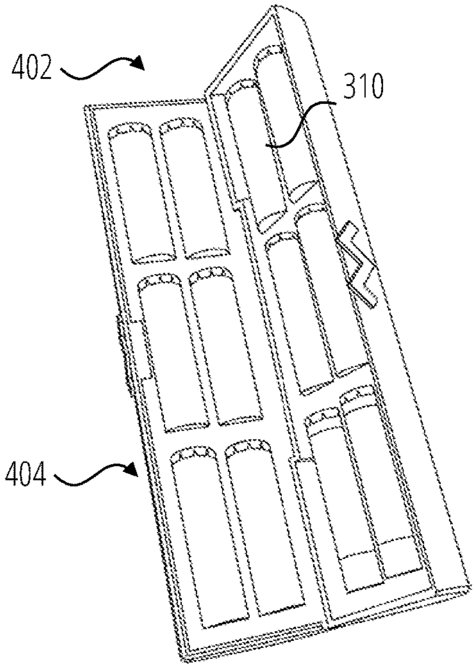
FIG. 4A illustrates an aspect of the serum capsules in accordance with one embodiment.

FIG. 4A shows the plurality of serum capsules 310 contained within serum pack 404.

Figure 4B:
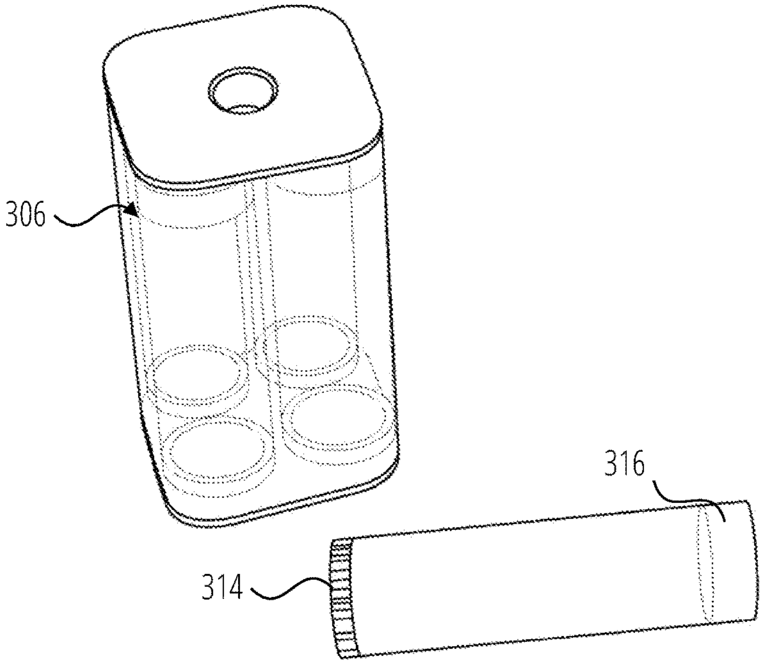
FIG. 4B illustrates an aspect of the serum capsules in accordance with one embodiment.

FIG. 4B illustrates the system comprising a capsule cartridge 306, a capsule piston base 316, a plurality of serum capsules 310, a serum outlet 314, and a chosen set of topical agents 402.

Figure 4C:
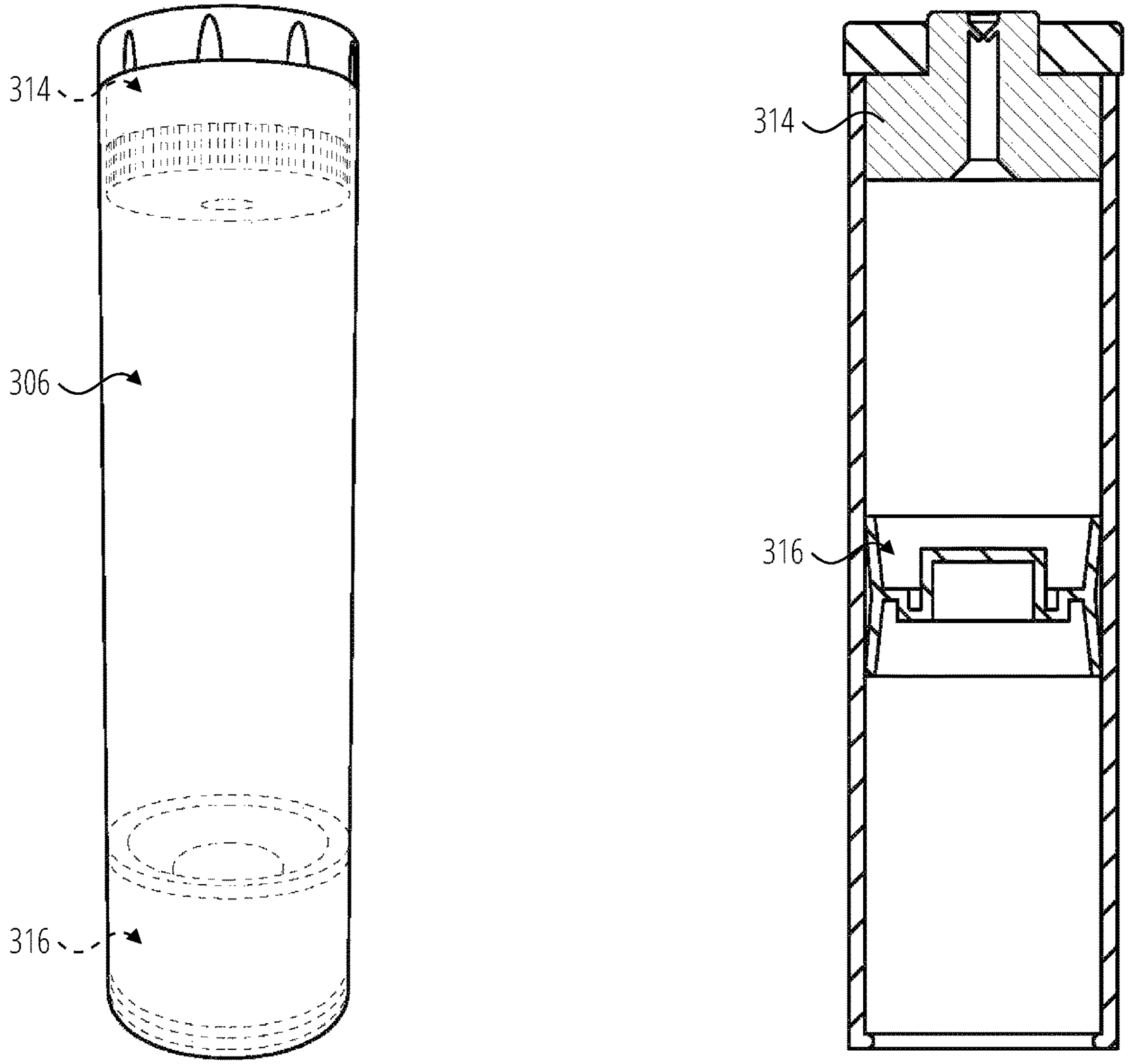
FIG. 4C illustrates an aspect of the serum capsules in accordance with one embodiment.

FIG. 4C shows a detailed view of the system comprising a capsule cartridge 306, a capsule piston base 316, and a serum outlet 314.

Figure 5:
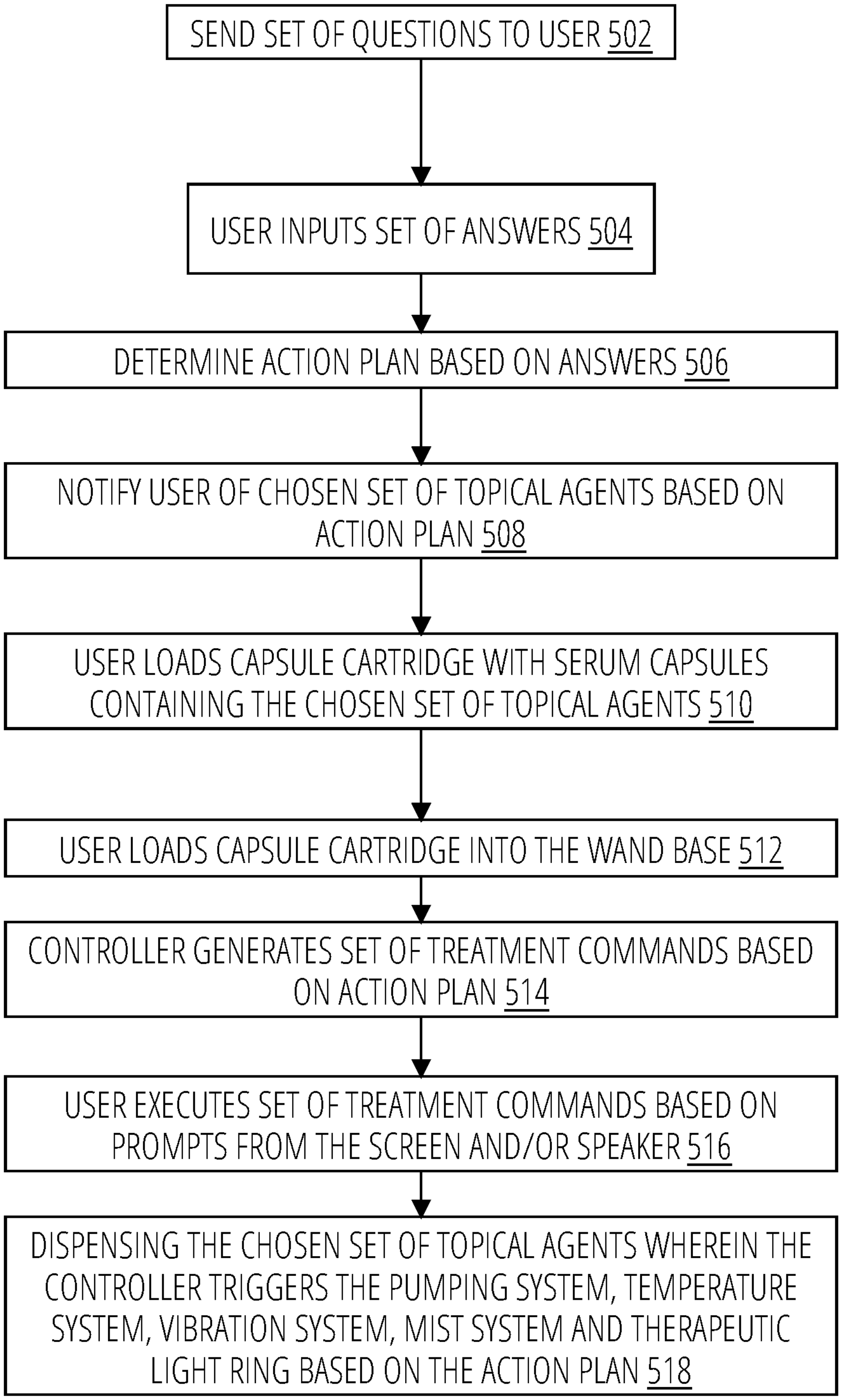
FIG. 5 illustrates an aspect of the subject matter in accordance with one embodiment.

FIG. 5 illustrates an example routine for a method of applying topical treatments to a user surface using the treatment device. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes sending a set of questions 502 to a user. The user then inputs a set of answers 504 using the screen 112 or speaker 114. A user software determines an action plan 506 based on the set of answers. The user is notified to choose a chosen set of topical agents 402 based on the action plan.

The action plan 506 can be tailored to fit the user's needs. In one embodiment, the action plan is derived to determine the chosen set of topical agents 402 to aid in certain skin conditions, and the amount that should be dispensed onto the applicator face 102 during use. The action plan may include settings for the timing and order of applying the chosen set of topical agents 402, the duration of application, the mist system 202, the temperature system 206, the therapeutic light ring 110 and the vibration system 204.

The user loads a capsule cartridge 306 with serum capsules 304 containing the chosen set of topical agents 402. The user then places the capsule cartridge 306 into the wand base 104. The controller generates a set of treatment commands based on the action plan.

The user then executes the set of treatment commands based on prompts from the screen 112 and/or speaker 114. The system dispenses the chosen set of topical agents 402 wherein the controller triggers the pumping system 308, temperature system 206, vibration system 204, mist system 202 and therapeutic light ring 110 based on the action plan.

As described in detail herein, the present invention can be embodied in various forms without departing from its spirit or essential characteristics. The appended claims indicate the scope of the invention, and all changes that come within the meaning and range of equivalence thereof are intended to be embraced. Equivalent or comparable means or combinations of the disclosed features may also be used to realize the invention in diverse forms. The invention is described in detail with reference to certain preferred embodiments. Still, variations and modifications exist within the spirit and scope of the invention as described and defined in the claims.

What is claimed is:

1. A treatment device comprising:

an applicator face having at least one agent outlet, a mist outlet and rolling balls;

a wand base connected to the applicator face;

a pumping system for dispersing a plurality of topical agents to the at least one agent outlet;

a plurality of serum capsules containing each plurality of topical agents adapted to be held in a capsule cartridge;

the plurality of serum capsules connected to the pumping system;

the rolling balls configured to aid in applying the plurality of topical agents to a user's face;

a temperature system;

a vibration system;

a mist system connected to the mist outlet;

a therapeutic light ring;

a controller having a processor with a user software configured to determine an action plan;

a screen and a speaker connected to the controller configured to interact with the user;

the temperature system, the mist system, the pumping system, the capsule cartridge, and the vibration system are housed inside the wand base;

the therapeutic light ring surrounds the applicator face configured to emit light at various wavelengths;

the speaker having an outlet on an exterior of the wand base; and the screen being located on the exterior of the wand base.

2. The treatment device of claim 1 wherein the mist system is configured to release a moisturizing mist through the mist outlet when triggered by the controller.

3. The treatment device of claim 1 wherein the rolling balls are configured to aid in the application of the plurality of topical agents to a user surface and wherein the vibration system is configured to vibrate the applicator face to aid in the absorption of the topical agents when triggered by the controller.

4. The treatment device of claim 1 wherein the pumping system further comprises:

a capsule input configured to engage a serum outlet of a serum capsule; and a piston configured to engage a capsule piston base wherein each of the plurality of serum capsules is adapted to contain each of the plurality of topical agents such that the topical agents are not exposed to the atmosphere before being dispensed from the agent outlet.

5. The treatment device of claim 1 wherein the temperature system is configured to adjust a temperature of the applicator face to correspond to a therapeutic temperature generated by the controller and wherein the therapeutic light ring is configured to emit a light wavelength from the applicator face in response to the controller.

6. A method of applying topical treatments using a treatment device comprising:

providing the treatment device having an applicator face having at least one agent outlet, a mist outlet and rolling balls, a pumping system for dispersing a plurality of topical agents, a plurality of serum capsules containing each plurality of topical agents adapted to be held in a capsule cartridge, a temperature system, a vibration system, a mist system connected to the mist outlet, a therapeutic light ring, a controller having a processor with a user software configured to determine an action plan, a screen, a speaker and a wand base connected to the applicator face;

generating a set of questions to determine the action plan with the processor;

inputting a set of answers using the screen;

generating a therapeutic application plan based on the set of answers;

determining a chosen set of topical agents based on the action plan;

loading the pluralities of serum capsules based on the chosen set of topical agents into the capsule cartridge;

loading the capsule cartridge into the wand base;

issuing a set of treatment commands instructing the user how to move the applicator face against a user surface; and dispensing the chosen set of topical agents wherein the controller triggers the pumping system, temperature system, vibration system, mist system and therapeutic light ring based on the therapeutic application plan.

7. The method of applying topical treatments of claim 6 further comprising:

releasing a moisturizing mist through the mist outlet when triggered by the controller.

8. The method of applying topical treatments of claim 6 further comprising:

rolling the rolling balls against the user surface to aid in the application of the plurality of topical agents to the user surface; and vibrating the applicator face to aid in the absorption of the topical agents when the vibration system is triggered by the controller.

9. The method of applying topical treatments of claim 6 further comprising:

engaging a serum outlet with a capsule input of a serum capsule;

engaging a capsule piston base with a piston; and activating the piston in response to the controller such that a topical agent is pumped from the pumping system to the agent outlet wherein each of the plurality of serum capsules is adapted to contain each of the plurality of topical agents such that the topical agents are not exposed to the atmosphere before being dispensed from the agent outlet.

10. The method of applying topical treatments of claim 6 further comprising:

adjusting a temperature of the applicator face to correspond to a therapeutic temperature generated by the controller with the temperature system; and emitting a light wavelength from the applicator face in response to the controller using the therapeutic light ring.

* * * * *